(12) United States Patent
Furuta et al.

(10) Patent No.: US 6,213,155 B1
(45) Date of Patent: Apr. 10, 2001

(54) FLUID-IMPERMEABLE COMPOSITE HOSE

(75) Inventors: Norihiko Furuta, Komaki; Nobuaki Niki, Inuyama, both of (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/438,467

(22) Filed: Nov. 12, 1999

(30) Foreign Application Priority Data

Nov. 11, 1998 (JP) .................................................. 10-320187

(51) Int. Cl.[7] ...................................................... F16L 11/00
(52) U.S. Cl. ........................ 138/123; 138/137; 138/140; 138/126; 138/DIG. 10
(58) Field of Search ..................................... 138/137, 141, 138/140, 143, 125, 126, DIG. 1, DIG. 7, DIG. 10

(56) References Cited

U.S. PATENT DOCUMENTS

| 3,614,967 | 10/1971 | Royston | 138/141 |
| 4,510,974 | 4/1985 | Natori et al. | 138/137 |
| 4,862,923 | 9/1989 | Kitami et al. | 138/125 |
| 5,488,975 | 2/1996 | Chiles et al. | 138/125 |

*Primary Examiner*—Patrick Brinson
(74) *Attorney, Agent, or Firm*—Jacobson, Price, Holman & Stern, PLLC

(57) ABSTRACT

A fluid-impermeable composite hose having a metallic foil in its wall includes as one of a plurality of layers forming its wall a laminated layer formed by laminating the metallic foil, a reinforcing material having a high stretch resistance and a resin film. The laminated layer protects the foil from being broken when the hose is deformed or stretched.

17 Claims, 4 Drawing Sheets

FLUID-IMPERMEABLE COMPOSITE HOSE

BACKGROUND OF THE INVENTION

1. Field of the Invention

This invention relates to a fluid-impermeable composite hose, and more particularly, to one for transporting a fluid, such as any of various kinds of gases, gasoline or a refrigerant. This invention is particularly useful as a hose for transporting a refrigerant, such as flons or carbon dioxide.

2. Description of the Related Art

As a hose for transporting a fluid, there is a demand for a fluid-impermeable hose which can, for example, transport any flon as a refrigerant without allowing it to leak out into the atmosphere and destroy the ozone layer, or realize a cooler system not necessitating any replenishment of a refrigerant, or a fuel hose not allowing any fuel vaporization. There is a particularly large demand for an improved hose for transporting e.g. carbon dioxide as a refrigerant, since this refrigerant gas easily permeates through the wall of a hose for a number of reasons including its high pressure, high temperature and low molecular weight.

It is effective to use a metallic foil to make a hose which is highly impermeable to a fluid and yet sufficiently flexible to resist any vibration satisfactorily. The foil has, however, the drawback of being broken very easily. Attempts have, therefore, been made to form a hose from a laminated sheet prepared by holding a metallic foil between a pair of resin films, or from such a laminated sheet and a thin elastic layer of e.g. rubber bonded thereto, so that the materials used with the foil may reduce or absorb the bending or expansive deformation of the hose which may cause the foil to be broken.

These attempts are effective for preventing the fatigue failure of the foil from being caused by its abnormal deformation, including wrinkling, as a result of the repeated bending or deformation of the hose, but there has not been proposed any hose including a metallic foil which is not broken by a tensile force when the wall of the hose is stretched.

A metallic foil forming a hose is not only broken when the hose is bent or deformed, but it is also broken easily when pulled, since it is hardly stretchable. If a hose formed from a laminated sheet comprising a metallic foil and resin films expands and has a wall portion stretched when holding a fluid having an elevated pressure, it is often the case that only the foil is broken, while the resin films remain unbroken because of their stretchability.

SUMMARY OF THE INVENTION

It is, therefore, an object of this invention to provide a fluid-impermeable hose including in its wall a metallic foil which is not damaged or broken even if the hose may be bent, deformed or stretched.

This object is essentially attained by a composite hose having a wall formed by a plurality of layers including a layer of a laminated sheet which comprises a metallic foil, a reinforcing material having a high stretch resistance and a resin film laid thereon.

The above and other objects and advantages of this invention will become more apparent from the following description and the accompanying drawings.

DETAILED DESCRIPTION OF THE INVENTION

Figure 1:
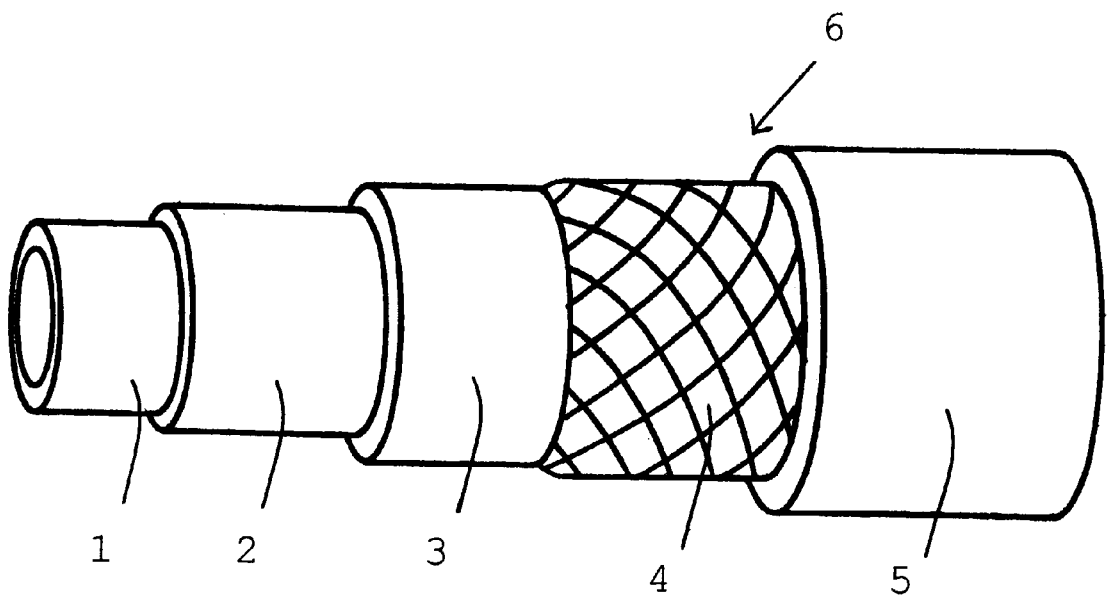
FIG. 1 is a partly cutaway perspective view showing a plurality of layers forming the wall of a fluid-impermeable composite hose according to a first preferred embodiment of this invention.

According to a first aspect of this invention, there is provided a fluid-impermeable composite hose having a wall formed by a plurality of layers including a laminated layer composed of a laminated sheet which comprises a metallic foil, a reinforcing material having a high stretch resistance and a resin film laid thereon. The stretch resistance of the reinforcing material protects the metallic foil from being broken by a tensile force bearing upon it in any direction when the hose has a wall portion expanded radially by a fluid having an elevated pressure, or stretched longitudinally by any unexpected tensile force acting upon it. The resin film protects the foil from any appreciable fatigue failure even if the hose may be bent or deformed. Thus, the hose can maintain a satisfactorily high level of flexibility and a high fluid impermeability for a long time as imparted to it by the metallic foil which it includes. The fluid impermeability means that the hose is impermeable to both a fluid which it transports, and water or any other fluid from any external source.

According to a second aspect of this invention, there is provided a hose in which the reinforcing material in the laminated sheet is a wire mesh, or a reinforcing fabric. A wire mesh, or reinforcing fabric is preferred as the reinforcing material in view of the properties and functions required of it as stated above.

According to a third aspect of this invention, there is provided a hose in which the metallic foil and reinforcing material in the laminated sheet are so bonded to each other as to form a unitary structure. This construction has the advantage that, even if the resin film may be stretched as a result of the radial expansion, or longitudinal stretching of the hose, the foil held by the reinforcing material is not pulled thereby, but is still more resistant to breaking.

According to a fourth aspect of this invention, there is provided a hose in which the laminated layer is formed by a helically wound, or longitudinally lapped tape of the laminated sheet. The helical winding, or longitudinal lapping of the tape greatly facilitates the formation of the laminated layer on the hose which is a cylindrical body. The helically wound, or longitudinally lapped tape preferably has its edge portions overlap each other to some extent or other to ensure the fluid tightness of the laminated layer.

According to a fifth aspect of this invention, there is provided a hose in which the tape has its edge portions overlapping each other and bonded to each other. The overlapping edge portions bonded to each other ensure the still higher fluid tightness of the laminated layer.

According to a sixth aspect of this invention, there is provided a hose including an elastic layer joined to the laminated layer. The metallic foil is still more resistant to fatigue failure, or breaking, since when the hose is bent or deformed, the foil is protected not only by the resin film, but also by the elastic layer which reduces or absorbs any force acting upon the foil when the hose is bent or deformed.

According to a seventh aspect of this invention, there is provided a hose in which the layers consist of (1), (2) and (4), or (1), (2), (3) and (4), as viewed in the order of their appearance radially outwardly across the wall:

(1) an inner layer of rubber;

(2) the laminated layer, or the laminated and elastic layers;

(3) a reinforcing layer; and (4) an outer layer of rubber.

These combinations of layers are typical or preferred examples of the wall structure of the hose according to this invention.

The invention and the first to seventh aspects thereof will now be described in further detail.

[Fluid-Impermeable Composite Hose]

The fluid-impermeable composite hose of this invention can be used for transporting various kinds of fluids, such as various kinds of gases, fuels and refrigerants (e.g. flons and carbon dioxide). It is particularly useful as a hose for transporting a fuel, or refrigerant of which the effects on the environment have to be strictly restricted.

The hose of this invention is not specifically limited in construction if it has a composite wall including a laminated layer which includes a metallic foil. Typical or preferred examples of its wall structure are, however, given by a wall including a laminated layer between an inner layer of rubber and an outer layer of rubber, a wall further including an elastic layer joined to the laminated layer and a wall further including a reinforcing layer between the laminated layer, or the laminated and elastic layers and the outer layer.

The inner layer may be of any rubber, but is preferably of any of butyl rubber (IIR), chlorinatedbutyl rubber (Cl-IIR), brominated butyl rubber (Br-IIR), acrylonitrile-butadiene rubber (NBR), chlorinated polyethylene rubber (CPE), ethylene-propylene-diene rubber (EPDM) and chlorosulfonated polyethylene rubber (CSM). The outer layer also may be of any rubber, or resin, but is preferably of any of chloroprene rubber (CR), butyl rubber, chlorosulfonated polyethylene rubber and ethylene-propylene-diene rubber.

The reinforcing layer may be of any known structure and may, therefore, comprise, for example, a braided layer of wire, or reinforcing fiber, two spiral layers of reinforcing fiber wound spirally in opposite directions to each other, or two such spiral layers between which an intermediate layer of rubber is interposed.

Every two adjoining layers, such as the inner or outer layer and the laminated layer (or the laminated/elastic layers) may or may not be bonded to each other with an adhesive, or otherwise.

[Laminated Sheet]

The laminated layer is formed by a laminated sheet which comprises a metallic foil, a reinforcing material having a high stretch resistance and a resin film laid on one or both sides thereof. The resin film may be fused, or adhesively bonded to the foil, or reinforcing material.

The reinforcing material may be of any kind if it has a high stretch resistance, but is preferably a flexible material. A few examples of preferred materials are a wire mesh and a reinforcing fabric, such as canvas or nonwoven fabric formed from aramid, carbon, glass or other fibers of low stretchability, while a resin film of high strength can also be used.

The reinforcing material may be located either inwardly or outwardly of the foil, but is preferably located outwardly. The foil and reinforcing material are preferably bonded to each other for the reasons as stated before in connection with the hose according to the third aspect of this invention, though they may not necessarily have to be bonded to each other. The resin film may or may not be bonded to the foil, or reinforcing material.

The resin film may be of any resin, but is preferably of a thermoplastic resin, such as a polyamide (PA), polyethylene terephthalate (PET), or ethylene-vinyl alcohol copolymer resin. The resin film is not specifically limited in rigidity or thickness, but preferably has a flexural modulus of 1,000 to 300,000 kgf/cm2 and a thickness of 5 to 100 µm.

[Laminated Layer]

The laminated layer may be formed in any shape from the laminated sheet, but can advantageously be formed by a helically wound, or longitudinally lapped tape of the laminated sheet. The longitudinally lapped layer may be formed by placing a tape along the length of the inner layer which is tubular in shape, and lapping it around the inner layer. The helically wound, or longitudinally lapped tape preferably has its edge portions overlap each other to ensure the fluid tightness of the laminated layer, and more preferably has its overlapping edge portions bonded to each other by the fusion of the resin film, or with the aid of an adhesive.

[Elastic Layer]

The elastic layer protects the metallic foil still more effectively if it is joined to the laminated layer, as is obvious from the foregoing description of the hose according to the sixth aspect of this invention, though it may not be an essential component of the hose according to this invention. The elastic layer is preferably a layer of sponge, or a relatively thin layer of rubber, and is preferably bonded to the inner or outer side of the laminated layer, or more preferably to the outer side thereof, by the fusion of the resin film in the laminated layer, or with the aid of an adhesive.

DESCRIPTION OF THE PREFERRED EMBODIMENTS

The invention will now be described more specifically by a few preferred embodiments thereof.

Preferred Embodiment 1

Figure 2A:
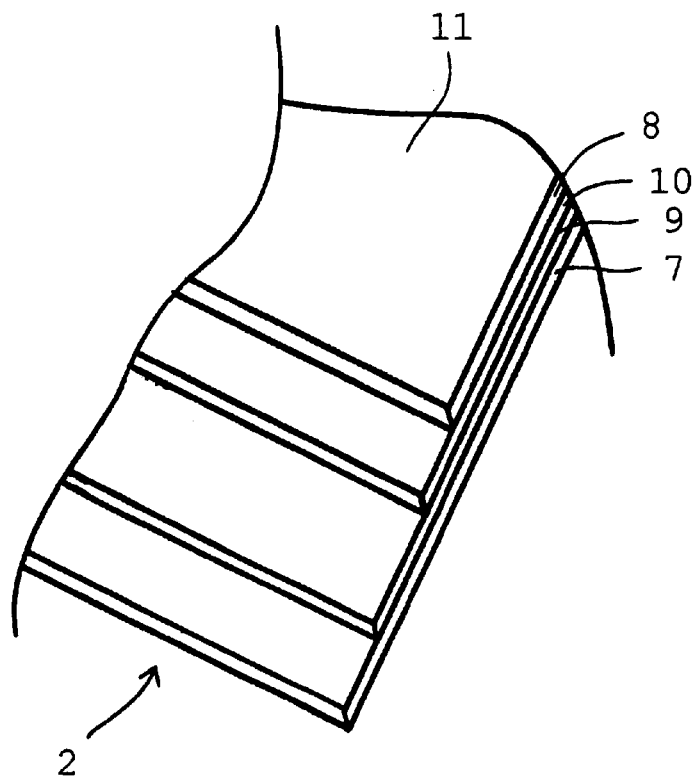
FIG. 2A is a partly cutaway perspective view showing a plurality of components forming a laminated layer in the wall of the hose shown in FIG. 1.
Figure 2B:
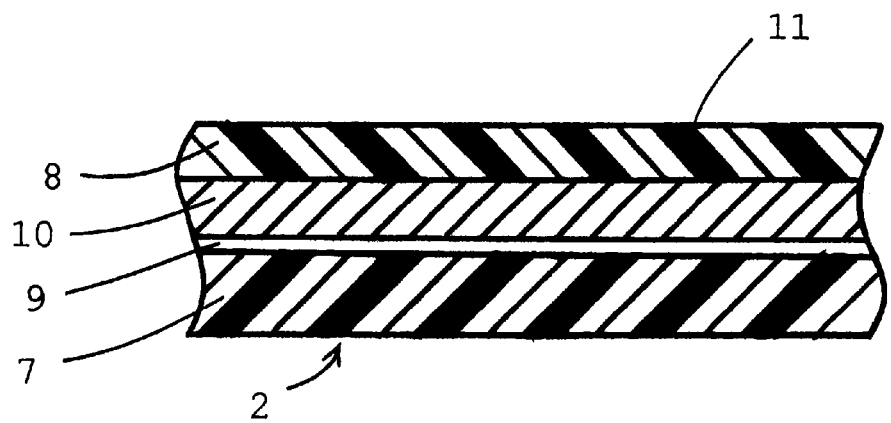
FIG. 2B is a cross sectional view of the same laminated layer.

FIG. 1 shows a fluid-impermeable composite hose 6 having a composite wall formed by an inner layer 1 of IIR, a laminated layer 2, which is shown in detail in FIGS. 2A and 2B, an elastic layer 3 of IIR, a reinforcing layer 4 formed by braiding reinforcing fiber of an appropriate material and an outer layer 5 of EPDM, as viewed in the order of their appearance radially outwardly across the wall.

The laminated layer 2 is composed of a laminated sheet 11 prepared by bonding an aluminum foil 9 and a reinforcing canvas 10 together between an inner resin film 7 and an outer resin film 8 which are each a thin film of a thermoplastic resin known as PET, as shown in FIGS. 2A and 2B. The metallic foil 9 is bonded to the reinforcing material 10 by an adhesive not shown to form a unitary structure, and is so held thereby that no tensile force acting upon the laminated layer 2 may affect the foil 9. The foil 9 is shown as being located inwardly of the reinforcing material 10, but their positions can be reversed.

Figure 3:
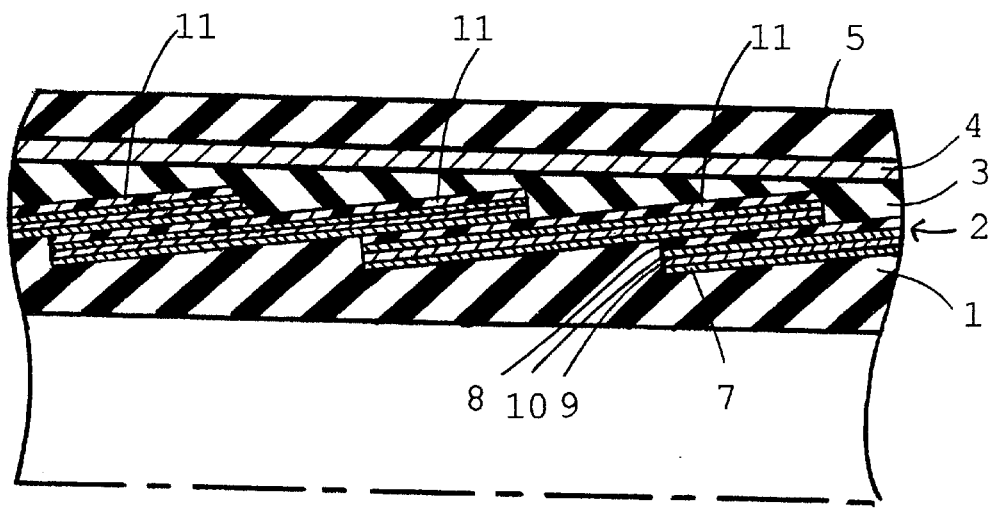
FIG. 3 is a fragmentary longitudinal sectional view of the hose shown in FIG. 1.

The laminated layer 2 may be formed by winding a tape of the laminated sheet 11 helically about the inner layer 1, as shown in FIG. 3. The tape 11 has its edge portions overlapping each other to some extent or other, and bonded to each other with an adhesive to ensure the impermeability of the wall to a refrigerant, etc. to a still further extent.

Figure 4:
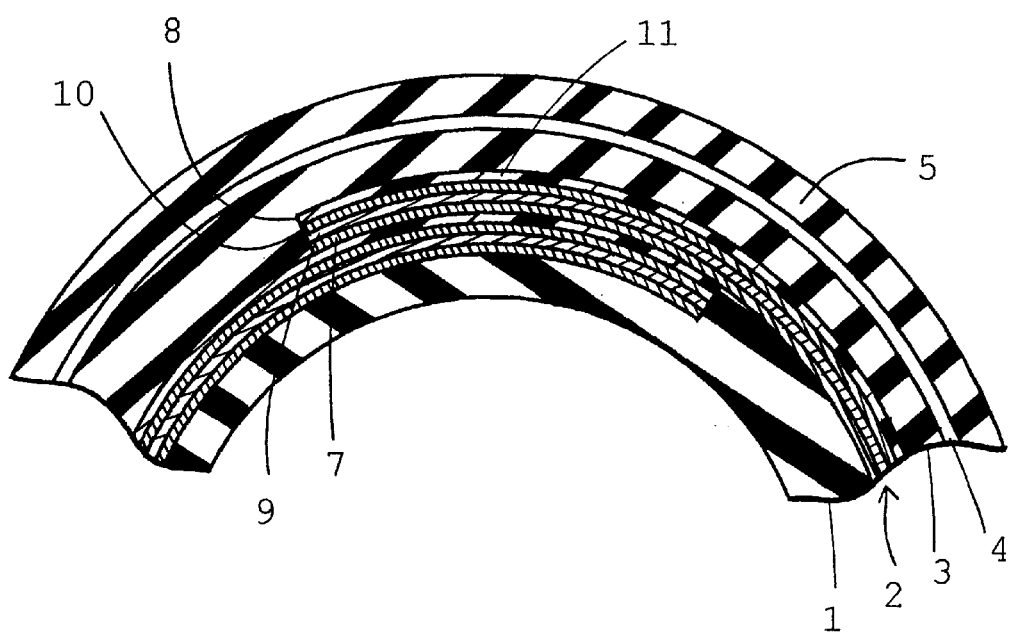
FIG. 4 is a fragmentary transverse sectional view of a modified form of the hose shown in FIG. 1.

A modified form of the laminated layer 2 is shown in FIG. 4, and comprises a longitudinally lapped tape of the laminated sheet 11 surrounding the inner layer 1. The tape 11 preferably has its edge portions overlapping each other and bonded to each other with an adhesive.

Preferred Embodiment 2

Figure 5:
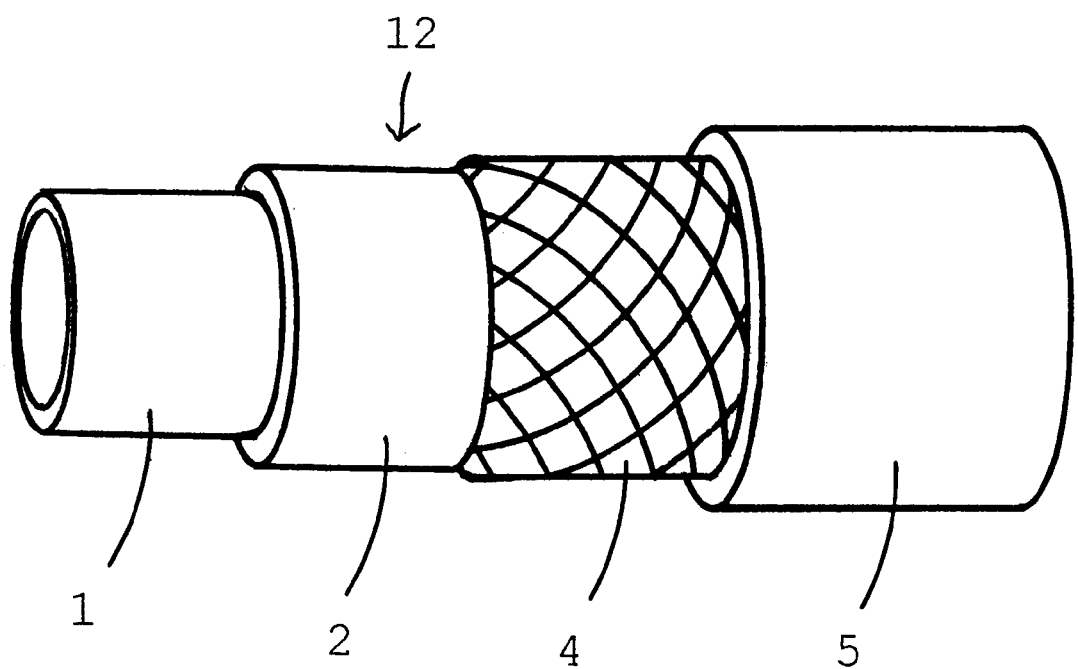
FIG. 5 is a partly cutaway perspective view showing a plurality of layers forming the wall of a fluid-impermeable composite hose according to a second preferred embodiment of this invention.

FIG. 5 shows a hose 12 having a composite wall formed by an inner layer 1 of rubber, a laminated layer 2, a reinforcing layer 4 and an outer layer 5 of rubber, as viewed in the order of their appearance radially outwardly across the wall. It is of the same construction with the hose shown in FIG. 1 from which the elastic layer 3 is excluded.

Modifications

Possible modifications include a structure obtained by excluding the reinforcing layer 4 from the hose 6 shown in FIG. 1, or the hose 12 shown in FIG. 5.

While the invention has been described by the preferred embodiments thereof, variations thereto will occur to those skilled in the art within the scope of the present inventive concepts which are delineated by the following claims.

What is claimed is:

1. A fluid-impermeable composite hose having a wall formed by a plurality of layers including a laminated layer having a metallic foil, wherein said laminated layer is of a laminated sheet comprising said foil, a reinforcing material having a high stretch resistance and a resin film laid thereon, and wherein said layers consist of (1), (2) and (4), or (1), (2), (3) and (4), as viewed in the order of their appearance radially outwardly across said wall:

(1) an inner layer of rubber;
   (2) said laminated layer, or said laminated layer and an elastic layer;
   (3) a reinforcing layer; and
   (4) an outer layer of rubber.

2. A hose as set forth in claim 1, wherein said hose is a hose for transporting a refrigerant.

3. A hose as set forth in claim 1, wherein said reinforcing material is selected from among a wire mesh and a reinforcing fabric.

4. A hose as set forth in claim 1, wherein said foil and said reinforcing material are so bonded to each other as to form a unitary structure.

5. A hose as set forth in claim 1, wherein said resin film is of a resin selected from among polyamide, polyethylene terephthalate, and ethylene-vinyl alcohol copolymer resins.

6. A hose as set forth in claim 1, wherein said resin film has a thickness of 5 to 100 $\mu$m and a flexural modulus of 1,000 to 300,000 kgf/cm2.

7. A hose as set forth in claim 1, wherein said laminated layer is formed by a helically wound, or longitudinally lapped tape of said laminated sheet.

8. A hose as set forth in claim 7, wherein said tape has its edge portions overlapping each other and bonded to each other.

9. A hose as set forth in claim 8, wherein said overlapping portions are bonded to each other by the fusion of said resin film, or with the aid of an adhesive.

10. A hose as set forth in claim 1, wherein said layers include an elastic layer joined to the inner or outer side of said laminated layer.

11. A hose as set forth in claim 1, wherein said inner layer is of any of butyl rubber(IIR), chlorinated butyl rubber(Cl-IIR), brominated butyl rubber(Br-IIR), acrylonitrile-butadiene rubber(NBR), chlorinated polyethylene rubber (CPE), ethylene-propylene-diene rubber(EPDM) and chlorosulfonated polyethylene rubber(CSM).

12. A hose as set forth in claim 1, wherein said outer layer is of any of chloroprene rubber(CR), butyl rubber(IIR), chlorosulfonated polyethylene rubber(CSM) and ethylene-propylene-diene rubber(EPDM).

13. A fluid-impermeable composite hose having a wall formed by a plurality of layers including a laminated layer having a metallic foil, wherein said laminated layer is of a laminated sheet comprising said foil, a reinforcing material having a high stretch resistance and a resin film laid thereon, and wherein said resin film is of a resin selected from the group consisting of polyamide, polyethylene terephthalate, and ethylene-vinyl alcohol copolymer resins.

14. A fluid-impermeable composite hose as set forth in claim 13 wherein said resin film is that of a polyamide resin.

15. A fluid-impermeable composite hose as set forth in claim 13 wherein said resin film is that of a polyethylene terephthalate resin.

16. A fluid-impermeable composite hose as set forth in claim 13 wherein said resin film is that of an ethylene-vinyl alcohol copolymer resin.

17. A fluid-impermeable composite hose having a wall formed by a plurality of layers including a laminated layer having a metallic foil, wherein said laminated layer is of a laminated sheet comprising said foil, a reinforcing material having a high stretch resistance and a resin film laid thereon, and wherein said resin film has a thickness of from 5 to 100 $\mu$m and a flexural modulus of from 1,000 to 300,000 kgf/cm$^2$.

* * * * *